United States Patent
Yi et al.

(10) Patent No.: US 12,297,517 B2
(45) Date of Patent: *May 13, 2025

(54) STEEL FOR HOT STAMPING, HOT STAMPING PROCESS AND HOT STAMPED COMPONENT

(71) Applicant: IRONOVATION MATERIALS TECHNOLOGY CO., LTD., Jiangsu (CN)

(72) Inventors: Hongliang Yi, Liaoning (CN); Dapeng Yang, Liaoning (CN); Xiaochuan Xiong, Jiangsu (CN); Guodong Wang, Liaoning (CN)

(73) Assignee: Ironovation Materials Technology Co., Ltd., Jiangsu (CN)

( * ) Notice: Subject to any disclaimer, the term of this patent is extended or adjusted under 35 U.S.C. 154(b) by 412 days.

This patent is subject to a terminal disclaimer.

(21) Appl. No.: 17/050,851

(22) PCT Filed: Dec. 27, 2018

(86) PCT No.: PCT/CN2018/124171
§ 371 (c)(1),
(2) Date: Oct. 27, 2020

(87) PCT Pub. No.: WO2019/205699
PCT Pub. Date: Oct. 31, 2019

(65) Prior Publication Data
US 2021/0214818 A1    Jul. 15, 2021

(30) Foreign Application Priority Data

Apr. 28, 2018 (CN) .......... 201810401260.8

(51) Int. Cl.
*C21D 9/48* (2006.01)
*B21D 22/02* (2006.01)
(Continued)

(52) U.S. Cl.
CPC ............. *C21D 9/48* (2013.01); *B21D 22/022* (2013.01); *C21D 1/673* (2013.01); *C21D 6/005* (2013.01);
(Continued)

(58) Field of Classification Search
CPC ........ C21D 9/48; C21D 6/005; C21D 8/0205; C21D 8/0226; C21D 8/0263;
(Continued)

(56) References Cited

U.S. PATENT DOCUMENTS 8,992,697 B2    3/2015    Matsuda et al.
10,301,699 B2    5/2019    Kawasaki et al.
(Continued)

FOREIGN PATENT DOCUMENTS

CN    102906291 A    1/2013
CN    105518173 A    4/2016
(Continued)

OTHER PUBLICATIONS

He Xinlai, et al., "High performance low carbon bainite steel composition, process, organization, properties and applications," Chapter 8: Composition, properties and overview of applications in related fields of typical low carbon painite steel, Metallurgical Industry Press, Jan. 2008 (ISBN: 978-7-5024-4411-2), p. 246 (with partial translation).
(Continued)

*Primary Examiner* — Katherine A Christy
(74) *Attorney, Agent, or Firm* — Morgan, Lewis & Bockius LLP (57) ABSTRACT

Steel for hot stamping, a hot stamping process and a hot stamped component, in which the steel for hot stamping contains in weight percentage C: 0.2-0.4%, Si: 0-0.8%, Al: 0-1.0%, B: 0-0.005%, Mn: 0.5-3.0%, Mo: 0-1%, Cr: 0-2%, Ni: 0-5%, V: 0-0.4%, Nb: 0-0.2%, Ti: ≤0.01%, and impurity
(Continued)

elements such as P, S, N unavoidable during smelting. The relationship 29*Mo+16*Mn+14*Cr+5.3*Ni≥30% is satisfied when B≤0.0005%, and 0.4-1.0% Al is contained when 0.0005%<B≤0.005%.

7 Claims, 3 Drawing Sheets

(51) Int. Cl.
    *C21D 1/673*     (2006.01)
    *C21D 6/00*     (2006.01)
    *C21D 8/02*     (2006.01)
    *C21D 8/12*     (2006.01)
    *C22C 38/00*     (2006.01)
    *C22C 38/02*     (2006.01)
    *C22C 38/04*     (2006.01)
    *C22C 38/06*     (2006.01)
    *C22C 38/44*     (2006.01)
    *C22C 38/46*     (2006.01)
    *C22C 38/48*     (2006.01)
    *C22C 38/50*     (2006.01)
    *C22C 38/54*     (2006.01)
    *C22C 38/58*     (2006.01)
    *C23C 2/28*     (2006.01)
(52) U.S. Cl.
    CPC ......... *C21D 8/0205* (2013.01); *C21D 8/0226* (2013.01); *C21D 8/0263* (2013.01); *C21D 8/1277* (2013.01); *C22C 38/001* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/28* (2013.01); *C23C 2/29* (2022.08); *C21D 2211/001* (2013.01)
(58) Field of Classification Search
    CPC ............ C21D 8/1277; C21D 2211/001; B21D 22/022; C22C 38/001; C22C 38/02; C22C 38/04; C22C 38/06; C22C 38/44; C22C 38/46; C22C 38/48; C22C 38/50; C22C 38/54; C22C 38/58
    USPC ......................................................... 148/537
    See application file for complete search history.

(56) References Cited

U.S. PATENT DOCUMENTS

| | | | |
|---|---|---|---|
| 11,371,109 | B2 | 6/2022 | Arlazarov et al. |
| 2006/0185774 | A1* | 8/2006 | Nishibata ................ C22C 38/42 148/330 |
| 2012/0279621 | A1 | 11/2012 | Gerber et al. |
| 2015/0079420 | A1 | 3/2015 | Hanlon et al. |
| 2018/0119245 | A1* | 5/2018 | Roubidoux .............. C21D 1/18 |
| 2019/0309385 | A1 | 10/2019 | Yi et al. |

FOREIGN PATENT DOCUMENTS

| | | |
|---|---|---|
| CN | 105658822 A | 6/2016 |
| CN | 106399837 A | 2/2017 |
| CN | 106811678 A | 6/2017 |
| CN | 106906420 A | 6/2017 |
| CN | 107829037 A | 3/2018 |
| CN | 108374127 A | 8/2018 |
| EP | 1642991 A1 | 4/2006 |
| EP | 2262918 A1 | 12/2010 |
| JP | 2004-238640 A | 8/2004 |
| JP | 2007-211276 A | 8/2007 |
| JP | 2012-041613 A | 3/2012 |
| JP | 2013-527312 A | 6/2013 |
| JP | 2013-151708 A | 8/2013 |
| KR | 10-2013-0014520 A | 2/2013 |
| KR | 10-2017-0086035 A | 7/2017 |
| WO | 2009/123804 A1 | 10/2009 |
| WO | 2018/067554 A1 | 4/2018 |

OTHER PUBLICATIONS

Extended European Search Report dated Oct. 12, 2021, issued in corresponding European Patent Application No. 18917017.8.
Iron and Steel Research Institute of the Ministry of Metallurgy, Ed., "Boron Steel Research Collection", Metallurgical Industry Press, p. 18, Mar. 1981.
Office Action (with partial translation) dated Sep. 20, 2022 issued in corresponding Japanese Patent Application No. 2020-560404.
Office Action (with partial translation) dated Jul. 27, 2022 issued in corresponding Chinese Patent Application No. 202210380045.0.
[Sutlinking] M. Karapiav, "Alloying Elements of Steels—Nitrogen", Chinese Industrial Press, pp. 1-2, Jun. 1966.
International Search Report (with partial translation) and Written Opinion issued in corresponding International Patent Application No. PCT/CN2018/124171, dated Mar. 14, 2019.
Office Action dated May 15, 2023, issued in corresponding Korean Patent Application No. 10-2020-7034235.
Notice of Rejection dated Sep. 5, 2023, issued in corresponding Chinese Patent Application No. 202210380045.0.
Guo et al, "Effects of Ti on Hardenability of Boron-bearing Track Steel", Iron Steel Vanadium Titanium, vol. 37, 4 No. 6, Dec. 2016 (with partial translation).
Jin et al., "Effect of Titanium on Microstructure and Properties of Hot Stamp-formed Steels Containing Boron", Materials for Mechanical Engineering, vol. 36, No. 8, Aug. 2012 (with partial translation).
Zhao et al., "Influences of Titanium Content and Austenitizing Temperature on Hardenability of 20MnMoB Steel", from the journal Hot Working Technology, No. 5 of the year 2001 (with partial translation).
Manual of Steel Material, vol. 4: Structural Alloy Steel, Edited by the Editor-in-Chief Committee of Manual of Steel Material, Standards Press of China (2003) pp. 51-52 (with partial translation).
Engineering Material, edited by Wang Xiaomin et al, China Machine Press (1999) p. 72 (with partial translation).

* cited by examiner

STEEL FOR HOT STAMPING, HOT STAMPING PROCESS AND HOT STAMPED COMPONENT

TECHNICAL FIELD

The present invention relates to a steel for hot stamping, a hot stamping process and a hot stamped component.

BACKGROUND ART

Lightweighting is an important way to realize energy saving and emission reduction in the automobile industry. Every 10% reduction in car body mass can reduce fuel consumption by 5-10%. Steel generally accounts for more than 60% of car body materials. The use of advanced high-strength steel can reduce the thickness of the parts, reduce the use of the material, and realize the weight reduction of the car body while ensuring the safety of the automobile. However, with the increase in the strength of steel at room temperature, the forming performance decreases, and the forming of the high-strength steel at room temperature is faced with problems such as springback and wear of forming dies. Therefore, cold stamping at room temperature can generally be used only for steel with strength below 1000 MPa.

On the other hand, hot stamping is to heat the sheet material to a high-temperature austenitized state, in which the steel sheet has a low strength (usually lower than 200 MPa) and a high elongation (as high as 50%) and can be formed into components with high formability and almost no springback. Moreover, the formed components are quenched by solid heat conduction in the die, transformed into martensite and hardened, so that the strength can reach more than 1500 MPa, which is the most effective means to solve the contradiction between high strength and formability. Compared with cold stamping, hot stamping has the advantages of high strength of the parts, good formability, small tonnage required for stamping, and high dimensional accuracy of the parts.

Hot stamping was proposed by a Swedish company in the 1980s. In recent years, the automobile industry around the world has invested a lot of energy in the development of ultra-high-strength steel sheets and the research of hot stamping technology, and the major automobile manufacturers in Europe, America, Japan and China have begun to try to use ultra-high-strength steel sheet components produced by hot stamping technology, such as vehicle door bumper bar, bumper reinforcement beam, A pillar, B pillar, C pillar, door frame reinforcement beam, etc.

Patent CN105518173A (hereinafter referred to as Patent Document 1) discloses a hot stamping material and method for producing same. In the hot stamping material described in Patent Document 1, the content of B (boron) is 0.0003-0.002%, preferably more than 0.0005%. Therein, the effect of B is to improve the hardenability of the steel sheet for hot stamping so that it becomes easy to obtain martensite in the microstructure of the hot stamped components.

Element B in the state of solid solution atoms is segregated at the grain boundary during the austenitization of the steel sheet to prevent the nucleation of ferrite, thereby ensuring that the austenitized steel sheet has sufficient hardenability during stamping deformation and cooling in the die and inhibiting the generation of ferrite, and the final microstructure dominated by martensite is obtained after cooling, so that a tensile strength of more than 1500 MPa can be achieved. At the same time, B, as an effective ferrite inhibitor, can greatly reduce the addition of alloying elements such as Mn, Cr, which is beneficial to reducing the cost of the alloy.

However, the molten steel will inevitably contain N derived from the raw materials and the air. Depending on the metallurgy quality, the N content in the molten steel is generally 20-60 ppm, and if abnormal, it may even be higher than 100 ppm. Due to the high diffusibility of B, N solubilizing in steel can form BN inclusions with B, and BN exists stably in austenite. The austenitizing temperature during hot stamping is about 900° C. BN cannot be dissolved at this temperature, so that the effect of inhibiting the generation of ferrite by segregation of B at the austenite grain boundary is weakened or even eliminated.

In order to exert the effect of B effectively, in Patent Document 1, a strong nitride forming element Ti is added. Since the binding force of Ti with N is higher than that of B, TiN can be formed to achieve the purpose of fixing N while keeping B in form of solid solution atoms, so that B can exert the effect of inhibiting the generation of ferrite and increasing the hardenability of steel sheet.

However, when Ti is used to fix nitrogen, coarse TiN particles (with particle size≥1 μm) may be formed. Moreover, TiN has a high dissolution temperature and does not dissolve during the austenitization process at around 900° C., and remains in the microstructure of the final formed part. Coarse TiN hard particles or TiN particles with relatively high density will become crack source when the material is deformed, leading to cleavage and fracture of hot stamped martensitic steel, and severely reducing the impact toughness of steel sheet.

In addition, CN102906291A (hereinafter referred to as Patent Document 2) discloses a high-strength pressed member and method for producing same. In Patent Document 2, a steel containing 0.12-0.69% C, more than 0.7% Si+Al, and 0.5-3.0% Mn is cooled to the temperature between $M_s$ and $M_f$ (50-350° C. in Patent Document 2) after being heated to the austenitizing temperature (750-1000° C. in Patent Document 2) and kept at this temperature, and then heated to the bainite transformation zone (350-490° C. in Patent Document 2), and the retained austenite is decomposed to produce bainitic ferrite and carbon-rich retained austenite, and the elongation of the steel sheet is increased by using the TRIP effect of retained austenite.

However, in Patent Document 2, it is required to cool the steel to a temperature between $M_s$ and $M_f$. According to the composition of steel in Patent Document 2, said temperature should be higher than room temperature. It is difficult to accurately control said temperature while the steel sheet is being cooled in the die after being hot stamped, and it needs to be raised to the bainite transformation temperature range immediately, which is difficult to achieve with existing industrial hot stamping process equipment.

DISCLOSURE OF THE INVENTION

The present invention is made in view of the above-mentioned problems existing in the prior art, and one of the objects is to provide a steel for hot stamping, which doesn't contain large TiN inclusions with particle size≥1 μm, and at the same time, the steel has sufficient hardenability.

Another object of the present invention is to provide a hot stamping process which is simple and can be completed with existing hot stamping equipment.

Another object of the present invention is to provide a formed component which doesn't contain large TiN inclusions with particle size≥1 μm and can avoid the problem of abnormally reduced toughness caused by this.

According to a first aspect of the present invention, a steel for hot stamping is provided, which in weight percentage contains C: 0.2-0.4%, Si: 0-0.8%, Al: 0-1.0%, B: 0-0.005%, Mn: 0.5-3.0%, Mo: 0-1%, Cr: 0-2%, Ni: 0-5%, V: 0-0.4%, Nb: 0-0.2%, Ti: ≤0.01%, and impurity elements such as P, S, N unavoidable during smelting, and in which 29*Mo+16*Mn+14*Cr+5.3*Ni≥30% is satisfied when B≤0.0005%, and 0.4-1.0% Al is contained when 0.0005%<B≤0.005%.

The steel for hot stamping according to the present invention contains no Ti or only contains trace amount of Ti, thereby avoiding the generation of large-size hard TiN inclusions (with particle size≥1 μm) and the resulting abnormal reduction in toughness of hot stamped components. At the same time, the hardenability of steel sheet is guaranteed, which can ensure that the microstructure dominated by martensite is obtained after hot stamping. Specifically, when B≤0.0005%, in order to ensure the hardenability of the steel plate, a certain amount of alloying elements Mn, Mo, Cr, Ni is added, and the relational formula 29*Mo+16*Mn+14*Cr+5.3*Ni≥30% is satisfied. On the other hand, when 0.0005%<B≤0.005%, 0.4-1.0% Al is added to fix N, thereby avoiding the generation of BN and exerting the effect of B in inhibiting the generation of ferrite.

Moreover, the steel for hot stamping according to the present invention has a critical cooling rate for producing full martensite of less than 30° C./s, which can meet the hardenability requirements of conventional hot stamping equipment, so that hot stamping can be carried out with conventional hot stamping equipment. And after hot stamping and tempering, yield strength of 1200-1800 MPa, tensile strength of 1500-2150 MPa and elongation of 7-10%, impact toughness of ≥45J·cm$^{-2}$ at −40° C. under confidence of 99.5% can be achieved.

As a preferred solution, the steel for hot stamping has in weight percentage a C content of 0.20-0.38%, a Si content of 0.1-0.5%, a Mn content of 0.8-2.2%, a Cr content of 0.1-0.5%, a Mo content of 0.2-0.6%, and a Ti content of 0-0.01%.

As another preferred solution, the steel for hot stamping has in weight percentage a C content of 0.24-0.4%, a Si content of 0.1-0.5%, a Mn content of 0.8-2.2%, a Cr content of 0.1-0.5%, a B content of 0.0005-0.004%, a Ti content of 0-0.01% and an Al content of 0.4-0.8%.

As another preferred solution, the steel for hot stamping has in weight percentage a C content of 0.3-0.4%, a Si content of 0.1-0.8%, a Mn content of 0.8-2.2%, a Cr content of 0-0.5%, a B content of 0.0005-0.004%, a Ti content of 0-0.01%, and an Al content of 0.4-0.9%.

The steel for hot stamping may be a hot-rolled steel sheet, a hot-rolled pickled sheet, a cold-rolled steel sheet, or a steel sheet with a coating.

Thereamong, the steel sheet with a coating may be a zinc-coated steel sheet, and the zinc-coated steel sheet is a hot-rolled steel sheet or a cold-rolled steel sheet formed with a metallic zinc coating, wherein the metallic zinc coating may be formed by at least one of hot-dip galvanizing, galvanizing annealing, zinc galvanizing and zinc-iron galvanizing.

Thereamong, the steel sheet with a coating is a hot-rolled steel sheet or a cold-rolled steel sheet formed with an aluminum silicon coating or a steel sheet formed with an organic coating.

According to a second aspect of the present invention, a hot stamping process is provided, including the following steps: a steel austenitizing step, in which the steel for hot stamping of the first aspect or a pre-formed component of said steel for hot stamping is provided, and heated to 800-950° C. and then kept at this temperature for 1 to 10000s; a steel transferring step, in which the above-mentioned steel or its pre-formed component after the above-mentioned steel austenitizing step is transferred to a hot stamping die, with the temperature of the steel maintained at or above 550° C. during the transferring; a hot stamping step, in which stamping, pressure holding and cooling are carried out, so that the steel in the die is cooled to 250° C. or lower at an average cooling rate of 10° C./s or higher, ensuring that the temperature of a component when the component exits the die is lower than 250° C.

For example, the pressure holding time of sheet with thickness of 1.2 mm can be set to 5-15s, and the pressure holding time of sheet with thickness of 1.8 mm can be set to 7-20s.

The hot stamping process according to the present invention is simple to control and can be completed with existing industrial hot stamping equipment.

In the steel austenitizing step, any one of roller hearth furnace, box heating furnace, induction heating, and resistance heating can be chosen as the heating method.

Preferably, after the hot stamping step, a tempering step is included, in which the formed component is heated to 150-200° C. and kept at this temperature for 10-40 minutes, or the above-mentioned formed component is heated to 150-280° C. in any manner and then kept at this temperature for 0.5-120 minutes, and then cooled in any manner.

Thereamong, the tempering step can be carried out by a painting process.

Thus, the tempering can be carried out in the painting step of the automobile final assembly process without additionally adding a heat treatment process.

According to a third aspect of the present invention, a hot stamped component is provided, which in weight percentage contains C: 0.2-0.4%, Si: 0-0.8%, Al: 0-1.0%, B: 0-0.005%, Mn: 0.5-3.0%, Mo: 0-1%, Cr: 0-2%, Ni: 0-5%, V: 0-0.4%, Nb: 0-0.2%, Ti: ≤0.01%, and impurity elements such as P, S, N unavoidable during smelting, and in which 29*Mo+16*Mn+14*Cr+5.3*Ni≥30% is satisfied when B≤0.0005%, and 0.4-1.0% Al is contained when 0.0005%<B≤0.005%.

The hot stamped component according to the present invention contains no TiN particles with particle size≥1 μm, thereby avoiding the problem of abnormally reduced toughness caused by this, and can be manufactured with conventional hot stamping equipment. At the same time, the hot stamped component according to the present invention can also obtain good mechanical properties. Specifically, yield strength of 1200-1800 MPa, tensile strength of 1500-2150 MPa and elongation of 7-10%, impact toughness of ≥45J·cm$^{-2}$ at −40° C. can be achieved. Said mechanical properties are equivalent to those of existing Ti-containing steel for hot stamping and even slightly improved.

Preferably, in the hot stamped component, the C content is 0.20-0.38%, the Si content is 0.1-0.5%, the Mn content is 0.8-2.2%, the Cr content is 0.1-0.5%, the Mo content is 0.2-0.6%, and the Ti content is 0-0.01% in weight percentage.

As another preferred solution, in the hot stamped component, the C content is 0.24-0.4%, the Si content is 0.1-0.5%, the Mn content is 0.8-2.2%, and the Cr content is 0.1-0.5%, the B content is 0.0005-0.004%, the Ti content is 0-0.01%, and the Al content is 0.4-0.8% in weight percentage.

As another preferred solution, in the hot stamped component, the C content is 0.3-0.4%, the Si content is 0.1-0.8%, the Mn content is 0.8-2.2%, the Cr content is 0-0.5%, the B content is 0.0005-0.004%, the Ti content is 0-0.01%, and the Al content is 0.4-0.9% in weight percentage. According to said solution, a high strength can be achieved under the condition of relatively low composition proportion of expensive alloys. The mechanical properties thereof are: tensile strength ≥1800 MPa, elongation ≥7.5%, −40° C. Charpy impact toughness (CVN) ≥50J·cm$^{-2}$.

The hot stamped component of the present invention can be manufactured by the hot stamping process of the second aspect.

DETAILED DESCRIPTION OF EXEMPLARY EMBODIMENTS

The technical solutions of the present invention will be described below in conjunction with the specific embodiments.

The steel for hot stamping of the present invention in weight percentage contains C: 0.2-0.4%, Si: 0-0.8%, Al: 0-1.0%, B: 0-0.005%, Mn: 0.5-3.0%, Mo: 0-1%, Cr: 0-2%, Ni: 0-5%, V: 0-0.4%, Nb: 0-0.2%, Ti: ≤0.01%, and impurity elements such as P, S, N unavoidable during smelting, wherein 29*Mo+16*Mn+14*Cr+5.3*Ni≥30% is satisfied when B≤0.0005%, and 0.4-1.0% Al is contained d when 0.0005%<B≤0.005%. The function and basis for the proportion of each element of the present invention are described as follows.

C: Carbon can stabilize the austenite phase and reduce the $A_{c3}$ temperature, thereby reducing the hot forming temperature. Carbon is an interstitial solid solution element, and its strengthening effect is much greater than that of a substitutional solid solution element. As the carbon content in the steel increases, the carbon content in the martensite after quenching will also increase, thereby improving the strength of the martensite. Therefore, under the condition of guaranteed hardenability, the strength can be effectively improved by increasing the carbon content. Increasing the carbon content is the most effective means to improve the strength of hot stamped steel, but as the carbon content increases, the toughness of steel sheet decreases and the welding performance deteriorates. Generally, the carbon content should not be too high. The carbon content of the steel of the present invention is 0.2-0.4%.

Si: Silicon is an effective deoxidizer and has a strong solid solution strengthening effect. It can also inhibit the precipitation of cementite during the tempering process and improve the tempering stability of steel. Too high silicon content may cause surface quality problems, and thus the silicon content of the steel of the present invention is 0-0.8%.

Al: In order to prevent the generation of large-size TiN inclusions, a composition design containing no Ti or trace amount of Ti is adopted in the present invention. Aluminum is a strong deoxidizing element and has a strong binding force with N. In the present invention, when the B content is greater than 0.0005%, in order to prevent the generation of BN and exert the effect of B segregated at the austenite grain boundary for improving the hardenability, Al of a relatively high content is to be added to bind with N. After painstaking research, the inventors have found that the generation of BN can be avoided by adding 0.4% or more Al. Too much addition of Al will increase the $A_{c3}$ temperature of steel, and will cause the problem that the resistance at the opening of the continuous casting crystallizer increases. Therefore, when the B content is greater than 0.0005%, the Al content of the steel of the present invention is required to be 0.4-1.0%; when the B content is less than 0.0005%, there is no need to keep B by using Al, and the Al content can be less than 0.4% or Al may not be added.

B: B can segregate at the austenite grain boundaries, thus inhibiting the generation of ferrite and improving the hardenability of steel during hot stamping. Higher than 0.0005% B can just play the role of inhibiting the generation of ferrite, too high content of B will cause boron embrittlement, so the B content of the steel of the present invention can be 0-0.005%; when 29*Mo+16*Mn+14*Cr+5.3*Ni≥30%, the hardenability of steel can be guaranteed, and the B content can be lower than 0.0005% or B may not be added.

Mn: Manganese is the most commonly used alloying element for improving the hardenability and can expand the austenite zone and lower the $A_{c3}$ temperature, which is beneficial to lowering the hot stamping temperature and refine the original austenite grains. Mn has a strong binding force with O and S, and is a good deoxidizer and desulfurizer, which can reduce or eliminate the hot brittleness of steel caused by sulfur and improve the hot workability of steel. Too high Mn content will reduce the oxidation resistance of steel, and at the same time deteriorate the welding and forming performance. The content of manganese in the steel of the present invention is 0.5-3.0%.

Mo: molybdenum can significantly improve the hardenability of steel, 0.2% and more molybdenum can effectively inhibit the generation of ferrite and significantly improve the hardenability of steel. Molybdenum can also improve the weldability and corrosion resistance of steel. Limited to cost, the Mo content should not be too high. The content of Mo in the steel of the present invention can be 0-1.0%.

Alloying elements such as Cr and Ni: elements, such as chromium, nickel can improve the hardenability of steel and improve the strength and hardness of steel. A mixed addition of Cr and Ni can significantly improve the hardenability of steel, but for cost consideration, the total content should not be too high, the Cr content can be 0-2%, and the Ni content can be 0-5%.

When the B content is lower than 0.0005%, in order to improve the hardenability of the steel sheet, a certain amount of elements, such as Mn, Mo, Cr, Ni, may be added. The above-mentioned four elements have different effects on the hardenability of the steel sheet. According to their effects on the hardenability, the elements are multiplied by corresponding coefficients. The inventor has found through diligent research that when 29*Mo+16*Mn+14*Cr+5.3*Ni≥30%, the hardenability of the steel sheet in a normal hot stamping process can be guaranteed.

V, Nb: a small amount of vanadium and niobium can form dispersed refined grain of carbides, nitrides and carbonitrides, thereby improving the strength and toughness of steel and consuming the carbon content of the martensite matrix, which can further improve toughness; and because these fine compounds are dispersed among the phases, precipitation strengthening can occur. An excessively high V and Nb addition amount has no obvious effect, and increases the cost. The V content in the steel of the present invention is 0-0.4%, and the Nb content is 0-0.2%.

Ti: Ti has a strong binding force with N. When Ti is used to fix N, in order to ensure a complete fixation of nitrogen, it must be satisfied that the weight ratio of Ti to N w(Ti)/w(N)≥3.4, wherein w(Ti) and w(N) represent respectively the weight percentages of Ti and N in steel. When the stoichiometric ratio of Ti to N is equal to 1, w(Ti)/w(N) is approximately equal to 3.4. When this condition is met, N in the steel can be completely reacted by Ti to precipitate TiN without causing a combination of the residual N in solid-solution state in the steel with B and a formation of BN. If the N content increases, Ti of a higher content must be added. However, the inventors of the present application have found that the volume fraction of coarse TiN particles (with particle size≥1 μm) in steel is proportional to w(Ti)*w(N), wherein w(Ti)*w(N) represents the product of mass percentages of Ti and N in steel. If w(Ti)*w(N) exceeds the product of their solid solubilities, TiN particle inclusions will be precipitated in the molten steel before the molten steel solidifies, the size of which can reach more than 10 microns. TiN has a high dissolution temperature, and does not dissolve during the austenitization process at around 900° C., and remains in the microstructure of the final formed component. Coarse TiN hard particles or TiN particles with high density will become crack source when the material is deformed, leading to cleavage and fracture of hot stamped martensitic steel and severely reducing the impact toughness of the steel sheet. Therefore, in the present invention, it is required that the Ti content in steel is less than 0.01%, or Ti may not be added.

N: Nitrogen is an interstitially solubilizing element that can significantly improve the strength of steel, and is an austenite stabilizing element, which expands the austenite region and lower the $A_{c3}$ temperature. N is apt to combine with strong nitride forming elements such as Ti and Al to form nitrides. TiN is a nitride precipitated from liquid and is apt to form large-size particles, which deteriorates the impact toughness of steel. In the present invention, no Ti or trace amount of Ti is added, which avoids the formation of large-size TiN. In the present invention, Al is used to fix N. Since AlN is a nitride precipitated from solid, under the influence of the formation kinetics, it can form fine and dispersed AlN inclusions, without serious impact on toughness. Therefore, in the present invention it is required that the N content in steel is just less than 0.01%.

P: In general, phosphorus is a harmful element in steel, which will increase the cold brittleness of steel, deteriorate the weldability, reduce the plasticity, and deteriorate the cold bending performance. In the steel of the present invention, the P content is required to be less than 0.02%.

S: Sulfur is also a harmful element in general, causing hot brittleness of the steel and reducing the ductility and welding performance of the steel. In the steel of the present invention, the S content is required to be less than 0.015%.

As a preferred embodiment of the steel of the present invention, the C content is 0.20-0.38%, the Si content is 0.1-0.5%, the Mn content is 0.8-2.2%, the Cr content is 0.1-0.5%, the Mo content is 0.2-0.6%, and the Ti content is 0-0.01%.

As another preferred embodiment of the steel of the present invention, the C content is 0.24-0.4%, the Si content is 0.1-0.5%, the Mn content is 0.8-2.2%, the Cr content is 0.1-0.5%, the B content is 0.0005-0.004%, the Ti content is 0-0.01%, and the Al content is 0.4-0.8%.

The steel of the present invention is smelted into steel ingots according to the designed composition, and subjected to 1200° C. homogenization for 5 hours, hot-rolled to the thickness of 3 mm in 5 to 8 passes with a final rolling temperature higher than 800° C., air-cooled to 650° C. and furnace-cooled, and subjected to simulated coiling, and cooled to room temperature and then pickled, cold-rolled to 1.5 mm, and subjected to a hot stamping experiment.

Table 1 shows the respective composition of the exemplary steels NT1-NT14 of the present invention and the comparative steels CS1, CS2. The Ti content in all exemplary steels of the present invention is less than 0.01%, NT1-NT10 have no B or has a B content of less than 0.0005%, and elements, such as Mn, Mo, Cr, Ni are added to ensure the hardenability of steel; the B content in NT11-NT14 is greater than 0.0005%, and a certain amount of Al is added to combine with N to avoid the generation of BN. The comparative steels CS1 and CS2 have the composition of the hot stamping steel in current industrial production. Steel CS1 has a B content of 0.002%, a N content of 0.0045%, and 0.039% Ti is added to combine with N; CS2 contains 0.0025% B, and 0.03% Ti is added to combine with N, and the N content is 0.0044%. The critical cooling rates were measured by heating materials to the austenitizing temperature by a thermodilatometre and cooling at a rate of 10, 15, 20, 25, and 30° C./s and observing resulting microstructures. A cooling rate was determined to be critical cooling rate when full martensite microstructure was obtained.

Conventional hot stamping equipment is used to produce 22MnB5, the critical cooling rate of which is about 30° C./s. The critical cooling rates of the comparative steels CS1 and CS2 lie in the range of 25-30° C./s. The critical cooling rates of the exemplary steels NT1-NT14 of the present invention are all less than or equal to this value, indicating that the steel composition of the present invention can meet the requirements of conventional hot stamping equipment for the hardenability, and all exemplary steels can obtain full martensite microstructure after hot stamping with the process shown in Table 2.

TABLE 1 indicates the composition (mass percentage) and critical cooling rate (° C./s) of the exemplary steels of the present invention and the comparative steels.

| Steel No. | C | Si | Al | B | Mn | Mo | Cr | Ni | V | Nb | Ti | 29 * Mo + 16 * Mn + 14 * Cr 5.5 * Ni | N | Critical Cooling Rate |
|---|---|---|---|---|---|---|---|---|---|---|---|---|---|---|
| NT1 | 0.30 | 0.3 | — | — | 2.0 | 0.2 | — | — | 0.2 | 0.05 | — | 37.8 | 0.0046 | 25-30 |
| NT2 | 0.35 | 0.2 | — | — | 2.0 | — | 0.5 | — | 0.3 | — | — | 39.0 | 0.0039 | 25-30 |
| NT3 | 0.31 | 0.4 | — | — | 2.0 | — | — | 2.1 | — | — | — | 43.1 | 0.0043 | 20-25 |

TABLE 1-continued indicates the composition (mass percentage) and critical cooling rate
(° C./s) of the exemplary steels of the present invention and the comparative steels.

| Steel No. | C | Si | Al | B | Mn | Mo | Cr | Ni | V | Nb | Ti | 29 * Mo + 16 * Mn + 14 * Cr 5.5 * Ni | N | Critical Cooling Rate |
|---|---|---|---|---|---|---|---|---|---|---|---|---|---|---|
| NT4 | 0.33 | 0.2 | — | — | 1.1 | 0.4 | 0.6 | — | — | 0.07 | — | 37.6 | 0.0052 | 20-30 |
| NT5 | 0.26 | 0.2 | — | — | 1.2 | 0.5 | — | 0.9 | 0.2 | — | — | 38.5 | 0.0049 | 20-25 |
| NT6 | 0.26 | 0.3 | — | — | 1.0 | — | 1.2 | 0.7 | — | 0.06 | — | 36.5 | 0.0035 | 20-25 |
| NT7 | 0.31 | 0.3 | — | — | 1.3 | 0.3 | 0.5 | — | 0.2 | 0.05 | — | 36.5 | 0.0047 | 15-20 |
| NT8 | 0.27 | 0.2 | — | — | 1.2 | 0.1 | — | 3.0 | — | — | — | 38 | 0.0041 | 20-25 |
| NT9 | 0.29 | 0.4 | — | — | 1.7 | — | 1.8 | — | 0.1 | — | — | 52.4 | 0.0052 | 15-20 |
| NT10 | 0.32 | 0.2 | — | — | 0.8 | 0.2 | 0.7 | 1.1 | 0.3 | — | — | 34.2 | 0.0044 | 15-20 |
| NT11 | 0.27 | 0.2 | 0.46 | 0.0009 | 2 | — | — | — | — | 0.05 | — | — | 0.0046 | 25-30 |
| NT12 | 0.33 | 0.2 | 0.45 | 0.0021 | 2 | 0.2 | — | — | 0.2 | 0.05 | — | — | 0.0048 | 15-20 |
| NT13 | 0.32 | 0.2 | 0.6 | 0.0016 | 1.6 | — | — | — | 0.2 | 0.05 | — | — | 0.0045 | 20-25 |
| NT14 | 0.31 | 0.2 | 0.86 | 0.0010 | 2 | — | — | — | 0.2 | 0.06 | — | — | 0.0043 | 15-20 |
| CS1 | 0.33 | 0.2 | — | 0.0015 | 1.5 | — | — | — | 0.2 | — | 0.39 | — | 0.0045 | 25-30 |
| CS2 | 0.23 | 0.2 | — | 0.0025 | 1.2 | — | — | — | — | — | 0.030 | — | 0.0044 | 25-30 |

The hot stamping process of the present application includes the following steps:

Steel austenitizing: providing the steel for hot stamping with the above-mentioned alloying elements or its pre-formed component, and heating it to 800-950° C. and keeping it at this temperature for 1 to 10000s, wherein the heating method for said process step can be but not limited to roller hearth furnace, box heating furnace, induction heating, and resistance heating;

Steel transferring: transferring the above-mentioned heated steel onto a hot stamping die, ensuring that the temperature of the steel is equal to or higher than 550° C. while being transferred to the die;

Hot stamping: choosing a reasonable press tonnage according to the size of the above-mentioned steel sheet, with a stamping pressure value of, for example, 1-40 MPa, and determining the pressure holding time according to the sheet thickness, which, for example, it is kept at 4-40 s. For example, the pressure holding time of sheet with thickness of 1.2 mm can be set to 5-15s, and the pressure holding time of sheet with thickness of 1.8 mm can be set to 7-20s. For example, the die surface temperature is kept at 200° C. or lower by the cooling system of the die, so that the steel is cooled to 250° C. or lower at an average cooling rate of not less than 10° C./s in the die to ensure that the temperature of a component is equal to or lower than 250° C. when the component exits the die.

After the hot stamping, tempering can also be carried out. For example, during the painting process, the formed component is heated to 150-200° C. and kept at this temperature for 10-40 minutes; or the above-mentioned formed component is heated to 150-280° C. in any manner and kept at this temperature for 0.5-120 minutes and then cooled in any manner.

Table 2 shows the hot stamping process parameters of the exemplary steels NT1 to NT14 of the present invention and the comparative steels CS1 and CS2. All of the steels are kept at 870-900° C. for 5 minutes, and then the blanks are taken out and placed on the hot stamping die, the blank temperature is about 700° C. when the die closes, the stamping pressure is 10 MPa, the pressure is kept for 6s, the temperature of a component when the component exits the die is about 100° C., and then the blanks are air cooled to room temperature, and tempered at 170° C. for 20 minutes. This process can be realized with conventional hot stamping equipment.

TABLE 2 indicates the hot stamping process parameters of the exemplary steels of the present invention.

| Steel No. | Austenitizing temperature | Austenitizing time/min | Stamping pressure/ MPa | Blank tempearture when die closes | Pressure Holding Time/s | Component tempearture when component exits die/° C. | Tempering temperature/ ° C. | Tempering time/min |
|---|---|---|---|---|---|---|---|---|
| NT1 | 900 | 5 | 10 | 690 | 6 | 92 | 170 | 20 |
| NT2 | 900 | 5 | 10 | 702 | 6 | 103 | 170 | 20 |
| NT3 | 910 | 5 | 10 | 695 | 6 | 108 | 170 | 20 |
| NT4 | 910 | 5 | 10 | 710 | 6 | 95 | 170 | 20 |
| NT5 | 900 | 5 | 10 | 691 | 6 | 97 | 170 | 20 |
| NT6 | 890 | 5 | 10 | 699 | 6 | 102 | 170 | 20 |
| NT7 | 900 | 5 | 10 | 702 | 6 | 105 | 170 | 20 |
| NT8 | 880 | 5 | 10 | 706 | 6 | 98 | 170 | 20 |
| NT9 | 870 | 5 | 10 | 685 | 6 | 94 | 170 | 20 |
| NT10 | 910 | 5 | 10 | 703 | 6 | 105 | 170 | 20 |
| NT11 | 900 | 5 | 10 | 698 | 6 | 103 | 170 | 20 |
| NT12 | 910 | 5 | 10 | 707 | 6 | 94 | 170 | 20 |
| NT13 | 900 | 5 | 10 | 690 | 6 | 101 | 170 | 20 |
| NT14 | 910 | 5 | 10 | 709 | 6 | 107 | 170 | 20 |

TABLE 2-continued indicates the hot stamping process parameters of the exemplary steels of the present invention.

| Steel No. | Austenitizing temperature | Austenitizing time/min | Stamping pressure/ MPa | Blank tempearture when die closes | Pressure Holding Time/s | Component tempearture when component exits die/° C. | Tempering temperature/ ° C. | Tempering time/min |
|---|---|---|---|---|---|---|---|---|
| CS1 | 900 | 5 | 10 | 693 | 6 | 102 | 170 | 20 |
| CS2 | 900 | 5 | 10 | 703 | 6 | 104 | 170 | 20 |

Table 3 shows the mechanical properties of the exemplary steels NT1 to NT14 of the present invention and the comparative steels CS1 and CS2 after hot stamping. The tensile specimens are ASTM standard specimens with a gauge length of 50 mm, and the strain rate for the tensile mechanical properties testing is 2 mm/min. The yield strength is the stress value that produces 0.2% residual deformation. The impact specimen is a three-layered impact specimen. The impact test is carried out not less than 30 times for each type of steel, with random sampling locations.

The experimental results show that all exemplary steels of the present invention have a yield strength of ≥1200 MPa, a tensile strength of ≥1500 MPa, and a elongation of ≥7%, which are equivalent to the performance of the comparative steels, and the performance of some exemplary steels is even slightly improved compared with the performance of the comparative steels.

Figure 4:
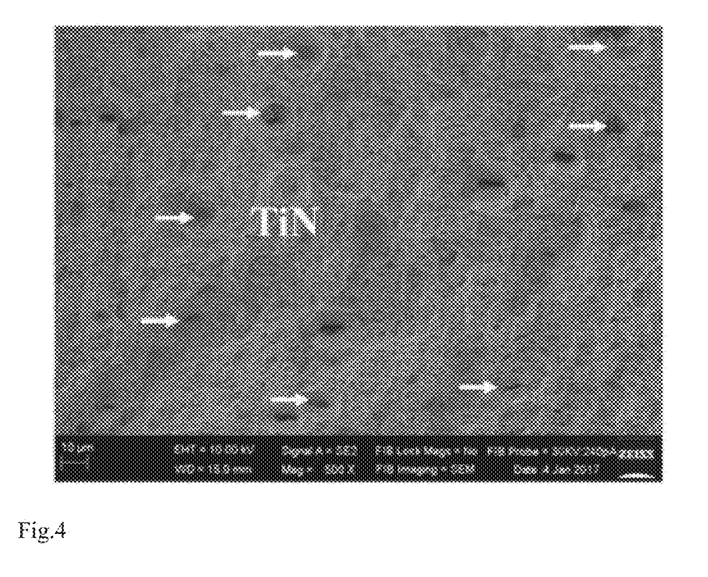
FIG. 4 shows the impact fracture morphology of the comparative steel, CS1 steel, when the impact data are abnormal.

Most of the data of the comparative steel CS1 at 20° C. are at or above 60 J·cm$^{-2}$, the impact toughness at −40° C. is mostly higher than 55 J·cm$^{-2}$, but an abnormal data rate of about 10% exists. The abnormal data show that the impact toughness at 20° C. is about 29 J·cm$^{-2}$, and the impact toughness at −40° C. is about 26 J·cm$^{-2}$. After the impact fracture analysis, as shown in FIG. 4, a large amount of TiN inclusions have been found at the fracture where the impact value was abnormal, with particle size above 1 μm, and some even have a particle size as high as 10 μm, indicating that the existence of large-size TiN has become the crack source, which seriously reduces the impact toughness.

Figure 5:
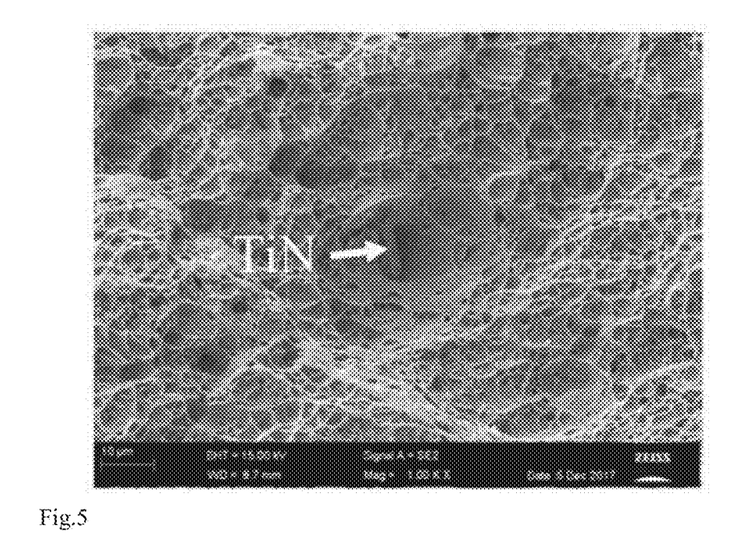
FIG. 5 shows the impact fracture morphology of the comparative steel, CS2 steel, when the impact data are abnormal.

Most of the data of the impact toughness of the comparative steel CS2 at −40° C. and 20° C. are concentrated around 60 J·cm$^{-2}$, but an abnormal data rate of about 5% exists. The abnormal data show that the impact toughness is only about 40 J·cm$^{-2}$. As shown in FIG. 5, a large amount of TiN have been found at the abnormal fracture of CS2, with particle size above 5 μm, indicating that the reason for abnormal reduction of the impact toughness of CS2 lies in the generation of large-size TiN caused by a relatively high content of N.

From the analysis of the comparative steels CS1 and CS2, it can be seen that the generation of TiN will deteriorate the toughness of the steel. Since the size and distribution of TiN are normally distributed according to the probability, both CS1 and CS2 containing coarse TiN inclusions will be in abnormal condition, with toughness reduced to about 40 J·cm$^{-2}$ or below.

Figure 1:
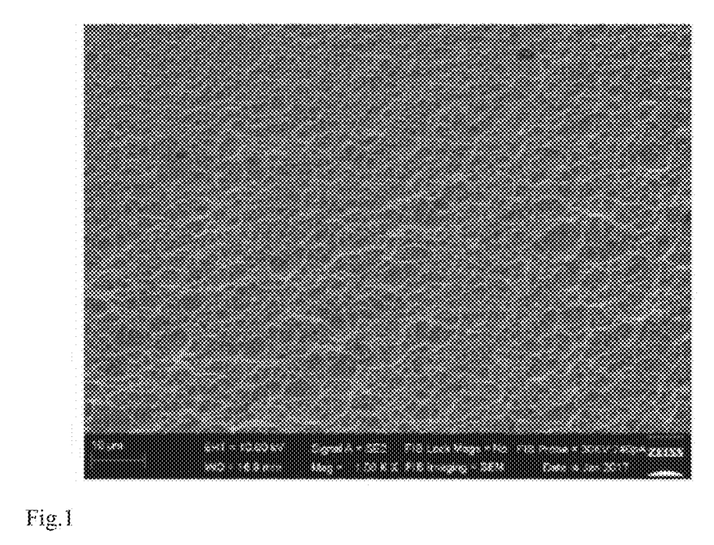
FIG. 1 shows the 20° C. impact fracture morphology of the exemplary steel for the present invention, NT1 steel.
Figure 2:
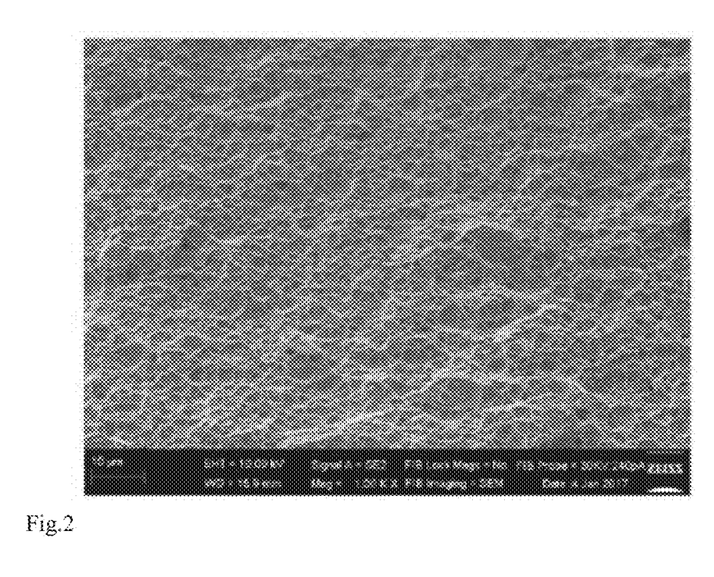
FIG. 2 shows the −40° C. impact fracture morphology of the exemplary steel for the present invention, NT1 steel.
Figure 3:
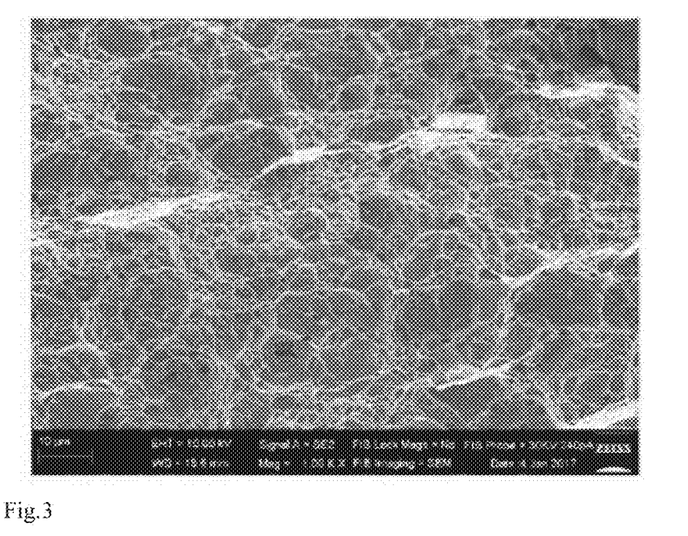
FIG. 3 shows the impact fracture morphology of the comparative steel, CS1 steel, when the impact data are normal.

In order to reduce the generation of TiN, the N or Ti content in the steel can be reduced. As the N content in steel is limited by metallurgy quality, the reduction of the N content will inevitably lead to a substantial increase in steelmaking costs. The content of Ti in the steel of the present invention is lower than 0.01%, and the content of TiN can be kept at a very low level without producing large-size TiN particles, so that the problem of insufficient toughness caused thereby can be avoided. The exemplary steels NT1-NT14 of the present invention have respectively an impact toughness value 60 J·cm$^{-2}$ or above at 20° C. and an impact toughness of 50 J·cm$^{-2}$ or above at −40° C., and no abnormal values exist. FIG. 1 shows the 20° C. impact fracture morphology of NT1 steel, and FIG. 2 shows the −40° C. impact fracture morphology of NT1 steel, wherein no inclusions have been found at the fracture. This morphology represents the impact fracture morphology of all exemplary steels of the present invention, indicating that the inclusions in the steel of the present invention will not significantly affect the impact toughness.

TABLE 3 indicates the mechanical properties of the exemplary steels of the resent invention.

| Steel No. | Yield Strength MPa | Tensile Strength MPa | Elongation % | Impact Toughness at 20° C. J · cm$^{-2}$ | Impact Toughness at −40° C. J · cm$^{-2}$ |
|---|---|---|---|---|---|
| NT1 | 1380 ± 16 | 1851 ± 15 | 8.0 ± 0.2 | 65.4 ± 3.0 | 56.6 ± 4.5 |
| NT2 | 1610 ± 19 | 1973 ± 12 | 7.9 ± 0.3 | 64.1 ± 1.7 | 55.2 ± 3.5 |
| NT3 | 1426 ± 11 | 1860 ± 18 | 8.7 ± 0.3 | 63.5 ± 3.2 | 56.3 ± 1.4 |
| NT4 | 1518 ± 17 | 1880 ± 20 | 7.2 ± 0.2 | 63.4 ± 1.5 | 55.8 ± 0.5 |
| NT5 | 1218 ± 19 | 1560 ± 14 | 7.9 ± 0.3 | 66.4 ± 2.8 | 56.4 ± 2.7 |
| NT6 | 1288 ± 16 | 1651 ± 16 | 8.1 ± 0.3 | 63.1 ± 1.9 | 55.2 ± 3.8 |
| NT7 | 1426 ± 11 | 1885 ± 19 | 8.5 ± 0.1 | 63.5 ± 3.0 | 54.7 ± 1.9 |
| NT8 | 1242 ± 23 | 1665 ± 11 | 7.5 ± 0.2 | 63.9 ± 1.7 | 55.5 ± 0.9 |
| NT9 | 1334 ± 20 | 1801 ± 20 | 8.2 ± 0.3 | 63.8 ± 2.9 | 56.9 ± 4.2 |
| NT10 | 1472 ± 13 | 1884 ± 17 | 7.6 ± 0.3 | 66.1 ± 2.0 | 54.8 ± 3.8 |
| NT11 | 1380 ± 9 | 1743 ± 13 | 7.7 ± 0.3 | 65.2 ± 1.4 | 54.8 ± 0.8 |
| NT12 | 1521 ± 19 | 1965 ± 23 | 8.7 ± 0.3 | 63.2 ± 1.4 | 53.8 ± 0.8 |
| NT13 | 1471 ± 15 | 1887 ± 22 | 7.9 ± 0.2 | 66.9 ± 1.9 | 56.7 ± 3.6 |
| NT14 | 1429 ± 18 | 1847 ± 12 | 7.8 ± 0.3 | 60.1 ± 2.5 | 55.2 ± 3.4 |
| Normal CS1 | 1574 ± 12 | 1905 ± 13 | 8.5 ± 0.3 | 64.0 ± 3.2 | 55.1 ± 1.4 |
| Abnormal CS1 | 1568 ± 11 | 1901 ± 14 | 8.2 ± 0.2 | 29.0 ± 1.5 | 26.4 ± 2.1 |
| Normal CS2 | 1156 ± 17 | 1541 ± 23 | 7.5 ± 0.3 | 61.0 ± 4.6 | 58.0 ± 2.2 |
| Abnormal CS2 | 1144 ± 16 | 1504 ± 8 | 7.2 ± 0.3 | 42.1 ± 1.3 | 41.6 ± 5.9 |

As shown in Table 3, the hot stamped component of the present invention can also obtain good mechanical properties while ensuring a good impact toughness. Specifically, a yield strength of 1200-1800 MPa, a tensile strength of 1500-2150 MPa and an elongation of 7-10%, a −40° C. impact toughness of ≥45J·cm$^{-2}$ can be achieved. The mechanical properties are equivalent to those of existing Ti-containing steel for hot stamping and even slightly improved. Among them, NT12 and NT14, in particular, can achieve a high strength under the condition of relatively low composition proportion of expensive alloys. Their mechanical properties are: tensile strength ≥1847±12 MPa, elongation ≥7.8±0.3%, −40° C. Charpy impact toughness (CVN) ≥53.8±0.8J·cm$^{-2}$.

The hot stamped component of the present invention can be used for the high-strength component of automobile, including but not limited to A-pillar, B-pillar, bumper, roof frame, underbody frame, and vehicle door bumper bar of automobile.

The above embodiments and experimental data are intended to illustrate the present invention exemplarily. It should be clear to those skilled in the art that the present invention is not limited to these embodiments, and various modifications can be made without departing from the protection extent of the present invention.

The invention claimed is:

1. A hot stamped component, wherein the hot stamped component in weight percentage contains C: 0.3-0.4%, Si: 0-0.8%, Al: 0.6%-0.9%, B: 0.0005%<B≤0.005%, Mn: 0.5-3.0%, Mo: 0-1%, Cr: 0-2%, Ni: 0-5%, V: 0-0.4%, Nb: 0-0.2%, Ti: <0.01%, N: 0.0045%≤N<0.01%, with the balance being Fe and impurity elements unavoidable during smelting,
wherein the hot stamped component contains no TiN particles with particle size≥1 μm,
wherein the hot stamped component has a yield strength of 1200-1800 MPa, a tensile strength of 1500-2150 MPa, an elongation of 7-10%, and an impact toughness of ≥45J·cm$^{-2}$ at −40° C. under confidence of 99.5%, and
wherein the hot stamped component contains dispersed AlN inclusions.

2. The hot stamped component according to claim 1, wherein in weight percentage the C content is 0.3-0.4%, the Si content is 0.1-0.5%, the Mn content is 0.8-2.2%, the Cr content is 0.1-0.5%, the B content is 0.0005%<B≤0.004%.

3. The hot stamped component according to claim 1, wherein in weight percentage the C content is 0.3-0.4%, the Si content is 0.1-0.8%, the Mn content is 0.8-2.2%, the Cr content is 0-0.5%, the B content is 0.0005%<B≤0.004%, and the Al content is 0.6%-0.9%.

4. The hot stamped component according to claim 1, wherein the hot stamped component has a yield strength of 1200-1629 MPa.

5. The hot stamped component according to claim 1, wherein the hot stamped component has a tensile strength of 1800-2150 MPa, an elongation of 7.5-10%, and an impact toughness of ≥50 J·cm$^{-2}$ at −40° C. under confidence of 99.5%.

6. The hot stamped component according to claim 1, wherein in weight percentage the N content is N: 0.0045%≤N<0.0052%.

7. The hot stamped component according to claim 1, wherein the hot stamped component in weight percentage contains C: 0.3-0.33%, Si: 0.2%, Al: 0.45%-0.85%, B: 0.0009%<B≤0.0021%, Mn: 1.6-2.0%, Mo: 0-0.2%, V: 0-0.2%, Nb: 0.05%, Ti: 0%, N: 0.0045%≤N<0.0048%, with the balance being Fe and impurity elements unavoidable during smelting,
wherein the hot stamped component contains dispersed AlN inclusions, and
wherein the hot stamped component has a yield strength of 1371 MPa to 1540 MPa, a tensile strength of 1730 MPa to 1988 MPa, an elongation of 7.4% to 9.0%, and an impact toughness of 53.0 J·cm$^{-2}$ to 60.3 J·cm$^{-2}$ at −40° C. under confidence of 99.5%.

* * * * *